INVENTOR
RICHARD R. JUNG

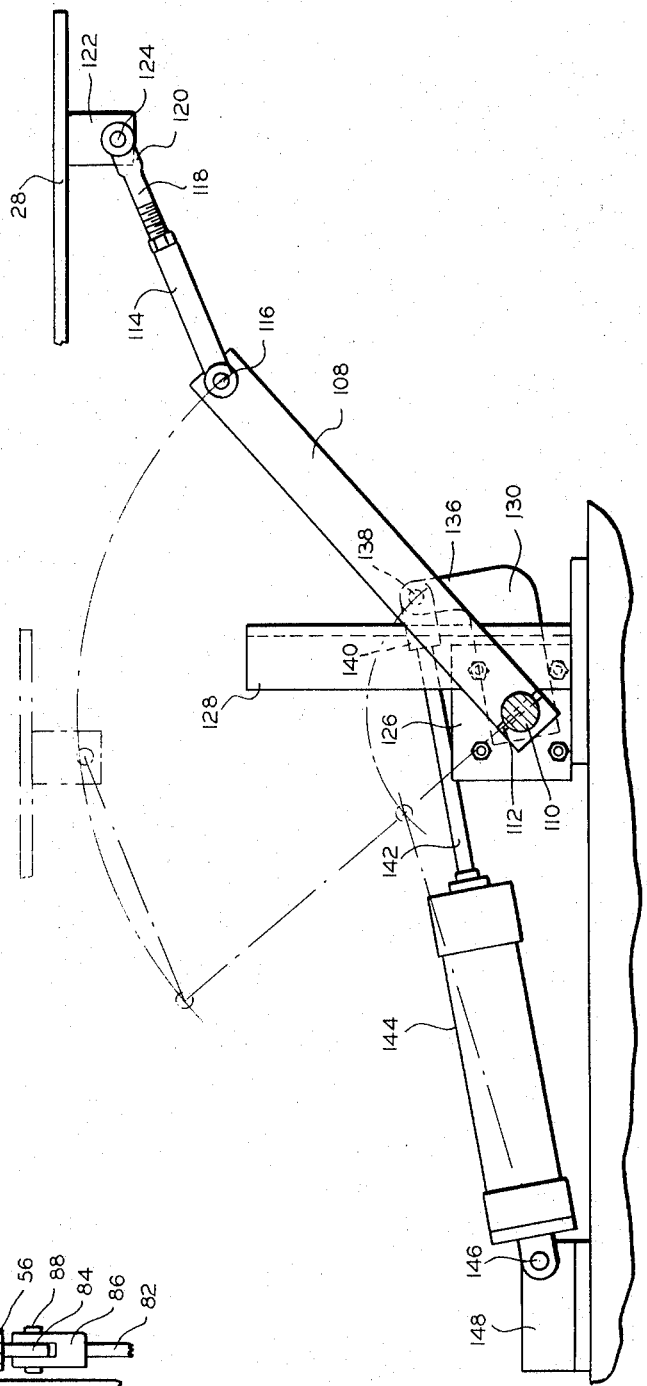
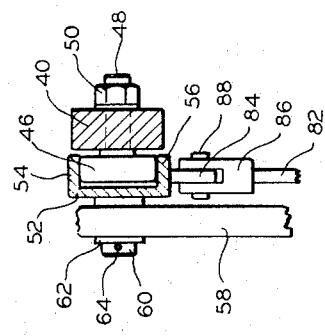

United States Patent Office 3,439,451
Patented Apr. 22, 1969

3,439,451
BRIDGING APPARATUS
Richard R. Jung, Battle Creek, Mich., assignor to Clark Equipment Company, a corporation of Michigan
Filed Apr. 20, 1967, Ser. No. 632,342
Int. Cl. E06b *11/00;* E05d *15/10;* E05f *11/38, 11/00*
U.S. Cl. 49—33                    7 Claims

ABSTRACT OF THE DISCLOSURE

An apparatus for use in selectively bridging a cavity and the like including a cover plate supported for movement from a cavity bridging position to a first position spaced from the bridging position by a first actuator, and being horizontally movable to uncover the cavity thrrough a second actuator controlled to effect such horizontal movement only after the cover plate has been moved to the first position.

Background of the invention

In the field of material handling, and in particular material handling of work pieces in conjunction with production facilities, it is conventional to use transporting devices such as pallets to transport the work pieces along an assembly line or to and from stations at which various operations are performed upon the work pieces. Some operations require the work pieces to be moved into chambers, such as vacuum chambers or pressure chambers, wherein certain operations are performed upon the work pieces. Such chambers generally have doors associated with them which must be opened to allow the work pieces to be introduced into the chambers and closed to seal the chambers with the work pieces inside. Frequently, chambers or production stations having closure doors thereon require cavities or pits immediately in front of the doors to allow the doors to project below the support surface of the assembly line from which the work pieces are transferred into the chamber. In such cases, it is generally necessary to provide means for bridging the cavity when the chamber doors are in open position to allow the pallets with work pieces thereon to be readily moved into the chambers. Moreover, in many cases, the bridging apparatus must provide a substantially contiguous surface between the assembly line supporting surface and the work supporting platform of the chamber when the chamber doors are open, while being readily movable to uncover the cavity and allow the closure doors of the chamber to be closed without interfering with the bridging apparatus. Bridging devices which substantially seal with the fixed supporting floor surface and the chamber support platform are particularly necessary when utilizing pallets of the type employing inflatable fluid pressure pads on the undersides thereof. The fluid pressurized pads form a thin film of fluid between the pallets and the supporting floor surface over which the pallets ride with very little friction resistance. An example of the last mentioned pallet is set forth in the copending application of Venkat K. Swamy, Ser. No. 503,175, filed Oct. 23, 1965, now Patent No. 3,392,800 and assigned to the assignee of the present invention.

Summary of the invention

It is one of the primary objects of the present invention to provide a bridging apparatus for use in bridging a cavity and the like between supporting floor surfaces, which bridging apparatus includes a cover plate member adapted to bridge the cavity in substantially sealed relation with the supporting surfaces, and actuating means to move the cover plate to a position uncovering the cavity while maintaining the plane of the cover plate substantially parallel to the plane of the floor supporting surface.

Another object of the present invention is to provide a bridging apparatus for bridging a cavity and the like in a supporting floor surface, which apparatus utilizes a novel supporting arrangement and control circuit for supporting and moving a cover plate member from a bridging position to a position wherein the cavity is uncovered, and returning the cover plate to its bridging positon.

Another object of the present invention is to provide a bridging apparatus as above described wheerin the control circuit is adapted to prevent movement of the cover plate member to a position uncovering the cavity prior to the cover plate being raised to a position spaced above the plane of the supporting floor surface.

A further object of the present invention is to provide a bridging apparatus as above described including the novel combination of parallel supporting links, guide channels, and actuators to effect upward movement of the cover plate member to a first position spaced above the plane of the supporting surface while maintaining the cover plate in parallel relation to the plane of the support surface, and thereafter moving the cover plate horizontally to a cavity uncovering position, the cover plate being selectively returnable to its cavity bridging position.

Another object of the present invention is to provide a bridging apparatus as described wherein the cover plate member includes sealing elements thereon which serve to fully seal the adjacent edges of the cover plate and supporting surfaces to provide a substantially contiguous planar surface over which a load transporting pallet may be readily moved.

In a preferred embodiment of a bridging apparatus in accordance with the present invention, a movable cover plate having a planar configuration substantially identical to the opening of the cavity to be bridged has a pair of parallel spaced extending arm members secured to the underside thereof which extend in generally parallel relation to the plane of the cover plate. Each of the extending arms rotatably supports a pair of roller members which are received within and supported in rolling relation by a guide channel pivotally mounted on the upper ends of a pair of parallel supporting link members. The ends of the links opposite their pivotal connections to the guide channels are pivotally connected to support members fixed to the foundation defining the cavity. The supporting link members and guide channels provide a supporting parallelogram linkage arrangement which maintains the plane of the cover plate parallel to the plane of the supporting floor surface during movement of the cover plate. First means including a fluid pressure actuated piston assembly is supported beneath each of the guide channels to selectively raise the channels and the cover plate to a position spaced above the plane of the support surface. Second means including a fluid pressure actuated piston assembly is selectively operable through a linkage arrangement to effect horizontal movement of the cover plate within the guide channels. A fluid pressure control circuit is operatively associated with the first and second fluid pressure operated actuating piston assemblies and includes control valves operative through movement of the supporting links to prevent actuation of the second actuating piston assembly prior to the cover plate being raised to a postion spaced above the supporting floor surface. Strip seals are secured to the edge portions of the cover plate adjacent the edges of the supporting surface to sealingly engage the supporting surface when the plate is in a bridging position, thus providing a generally contiguous surface over the cavity upon which load transporting pallets may be moved, with the cover plate being then readily removed to allow closure doors to be operatively maneuvered within the cavity.

Further objects and advantages of my invention, together with the organization and manner of operation thereof, may best be understood by reference to the following description of a preferred embodiment of the invention when taken in conjunction with the accompanying drawings, in which like reference numerals designate like parts throughout the several views and where:

*Brief description of the drawings*

FIGURE 3 is a partial vertical sectional view taken substantially along the line 3—3 of FIGURE 2, illustrating the operating mechanism for effecting horizontal movement of the cover plate;

FIGURE 4 is a sectional view taken along the line 4—4 of FIGURE 1 illustrating a cover plate support arm in supporting relation with a guide channel; and FIGURE 5 is a schematic representation of a fluid pressure control circuit for effecting movement of the cover plate supporting mechanism of FIGURES 1 and 2.

*Description of a preferred embodiment*

Figure 1:
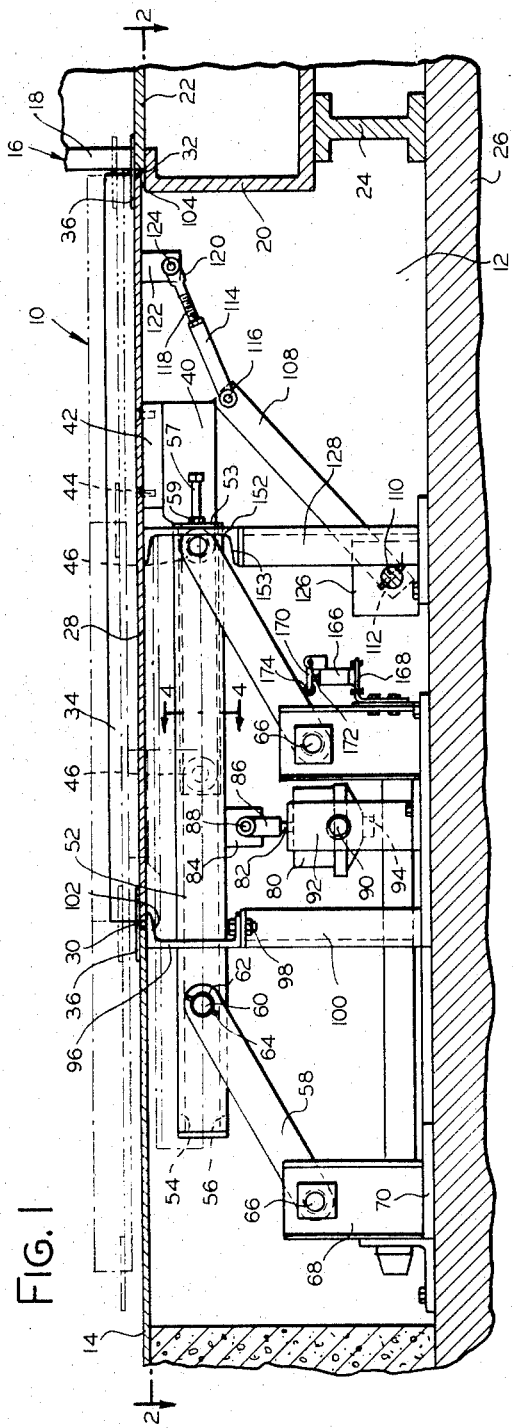
FIGURE 1 is a vertical sectional view illustrating a cavity formed below a supporting floor surface in front of a chamber, with a bridging apparatus in accordance with the present invention being shown in its cavity bridging position to provide a generally contiguous surface between the supporting floor surface and a support platform within the chamber.
Figure 2:
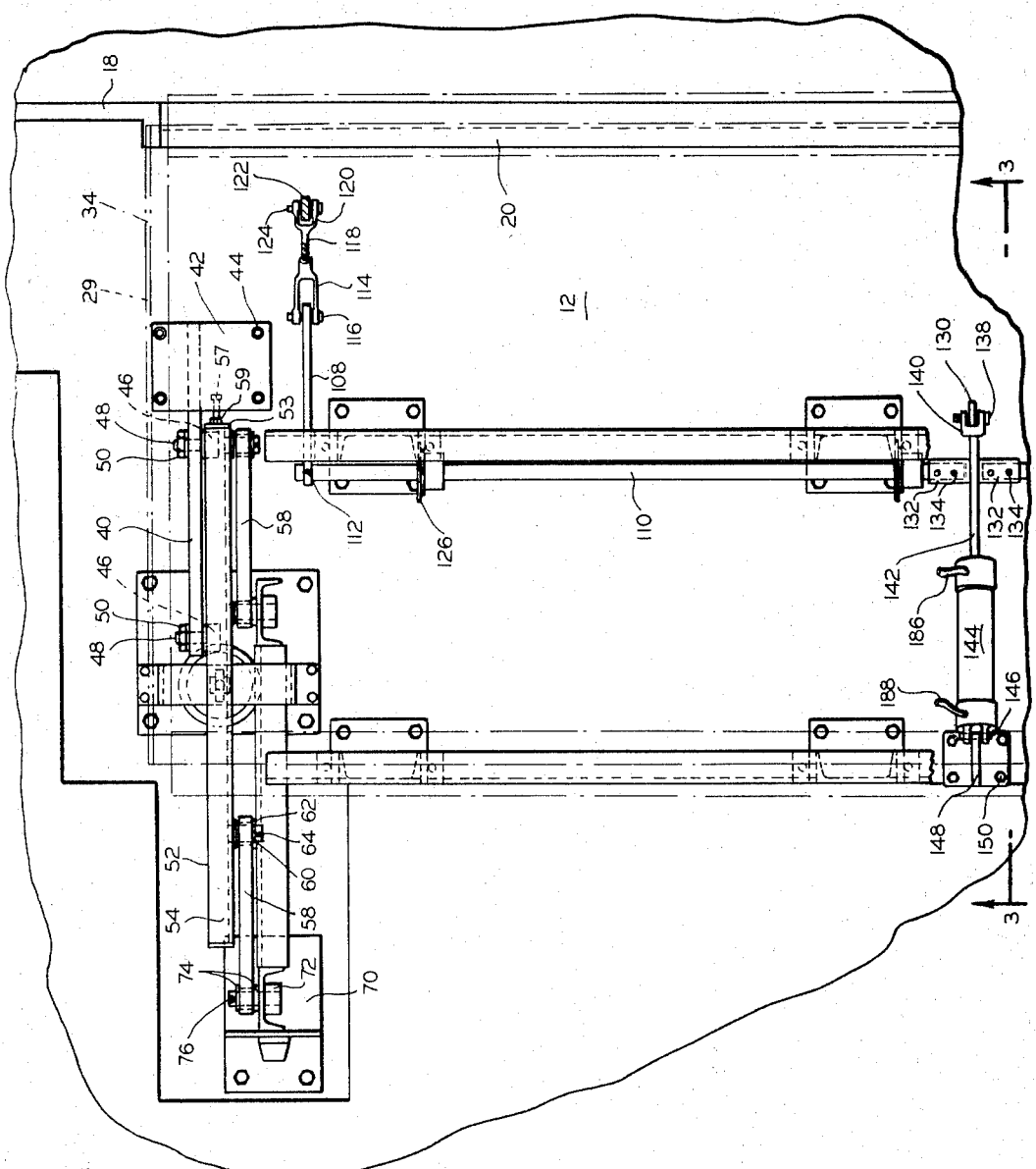
FIGURE 2 is a top view taken substantially along the line 2—2 of FIGURE 1 illustrating the mechanism for supporting and moving the cover plate member.

Referring now to the drawings, and in particular to FIGURES 1 and 2, a preferred embodiment of a bridging apparatus in accordance with the present invention, indicated generally at reference numeral 10, is illustrated in conjunction with the bridging of a cavity 12 provided below the plane of a floor supporting surface 14 and in front of a chamber, indicated generally at reference numeral 16. The chamber 16 may comprise a vacuum chamber into which work pieces or assembled articles are inserted while being subjected to a vacuum atmosphere, or may comprise a like production area having door closure members (not shown) adapted to seal the front opening of the chamber and which door closures extend below the surface 14 into the cavity 12 when in closed position. The chamber 16 includes a front wall portion 18 defining a portion of the opening through which work pieces may be passed, a base frame structure 20, and a work piece supporting surface or platform 22 supported on the base frame 20 in coplanar relation with the floor supporting surface 14. The base frame 20 of the chamber may be supported through an I-beam support 24 on a foundation 26 defining the bottom surface of the cavity or pit 12.

The bridging apparatus 10 includes a movable cover plate member 28 adapted for movement to bridge or cover an upper opening of the cavity 12 defined by a forward edge portion 30 on the supporting floor surface 14 and an edge portion 32 on the work supporting surface 22 of the chamber 16. Noting FIGURE 2, the cavity 12 extends outwardly from edge portions 29 on the cover plate 28 to allow the door members of the chamber 16 to be moved away from center while disposed within cavity 12 prior to being opened. The movable cover plate member 28 has an upstanding rail 34 suitably fixedly secured to each edge portion 29 thereof to prevent load transporting devices, such as pallets, from falling off the edge of the plate 28 during movement of the pallet across the bridging apparatus 10 into the chamber 16. A generally flat seal strip 36, preferably made of nylon, is suitably secured to the forward and rear edge portions of the cover plate member 28 adjacent the edges 30 and 32, respectively, of the supporting floor surface 14 and the supporting work surface 22 of chamber 16. The nylon seal strips 36 extend outwardly from the forward and rear edge portions of the cover plate 28 so as to engage the upper surfaces of supporting floor surface 14 and chamber supporting work surface 22 when the movable cover plate member 28 is in a cavity bridging position as illustrated in FIGURE 1. It will be seen that with the cover plate member 28 in bridging relation over the upper opening of cavity 12, with the seal strips 36 engaging the upper surfaces of floor support surface 14 and chamber supporting work surface 22, a generally planar contiguous surface is provided between the support surface 14 and the work surface 22 of the chamber to allow pallets to be readily transported thereover.

A pair of spaced parallel arm members 40 are suitably secured to the underside of the movable cover plate mmeber 28 through mounting brackets 42 and screws 44. The parallel spaced arms 40 are secured to the underside of the cover plate 28 such that they extend parallel to the plane of the cover plate, with one arm being provided generally adjacent each of the side edge portions 29 of the cover plate. Each of the arm members 40 rotatably supports a pair of roller members 46 through support pins 48 which are received through corresponding apertures in the support arm and secured therein through nuts 50. The rollers 46 are supported by their associated arm members 40 such that a plane containing the axes of rotation of the rollers is substantially parallel to the plane of the movable cover plate 28 and is spaced downwardly therefrom.

The rollers 46 on each of the arm members 40 are received within associated guide channels 52 having upper and lower horizontally extending flange portions 54 and 56, respectively, such that the rollers 46 are in rolling engagement between the upper and lower flange portions (FIGURE 4). The guide channels 52 in operative association with the roller members 46 provide a means to maintain the plane of the movable cover plate 28 in generally parallel relation to the plane of the supporting floor surface 14 during movement of the cover plate horiozntally to uncover the opening of cavity 12 during operation, as will be more fully described hereinbelow. The longitudinal lengths of the channel members 52 are such as to maintain the rollers 46 in fully supported relation between the flange portions 54 and 56 during movement of the movable cover plate 28 to its cavity uncovering position.

If desired, a set screw 57 and jam nut 59 may be suitably secured to a closed end portion 53 of each guide channel 52 to provide a positive adjustable stop against which the forwardmost rollers 46 abut when the cover plate is moved horizontally to the right (viewing FIGURE 1) in a manner to be described below.

Each of the guide channels 52 is pivotally supported on the upper ends of a pair of identically shaped supporting link members 58 through support pins 60 which are formed integral with or otherwise suitably secured in normal relation to the vertical web portions of the guide channels. The supporting links 58 may be suitably retained on the support pins 60 through annular spacer members 62 and press pins 64 disposed transversely through the outer ends of the pins 60. The ends of the supporting links 58 opposite their pivotal connections to the guide channels 52 are rotatably connected to and supported by rigid upstanding support members 68 through support pins 66 fixedly secured in normal relation to the support members 68. The support members 68 are in turn fixedly secured to the bottom foundation 26 of the cavity 12 through bracket plates 70. The support pins 66 may be suitably secured to the upstanding support members 68 in any suitable manner, such as by threaded engagement with block members 72 which are secured to the support members 68 as by welding. A pair of spacers 74 are preferably provided on each of the support pins 66 adjacent the side faces of the links 58, with press pins 76 being received within through-holes in the outer ends of the pins 66 to retain the spacers and supporting links on the support pins. The upstanding support members 68 may comprise generally U-shaped channel members of equal height, with the support pins 66 being secured thereon such that the axes of the support pins 66 are equidistantly spaced upwardly from the bottom foundation 26 of the cavity 12, the axes of the support pins 66 thereby lying in a plane parallel to a plane containing the axes of the above described support pins 60. As above noted, the supporting links 58 are of identical configuration such that, in combination with their respective guide channel 52 and support members 68, they form a parallelogram supporting link arrangement for the spaced parallel arm members 40 secured to the movable cover plate 28. The parallel supporting links 58 and their associated guide channels 52 further form a means for supporting the cover plate 28 such that the plane of the cover plate is maintained in parallel relation to the plane of the floor supporting surface 14 during movement of the cover plate to positions spaced upwardly from the plane of the floor supporting surface 14, as will be described below.

First means for moving the cover plate 28 to a position wherein the plane of the cover plate is spaced upwardly from the plane of supporting floor surface 14 and supporting work surface 22 of the chamber 16, is provided within the cavity 12. Such first means comprises a pair of fluid pressure actuated piston assemblies 80 having extensible pistons 82 which have their upper ends pivotally connected to depending plates 84 formed integral with or otherwise suitably secured, respectively, to the underside of a lower flange portion 56 of an associated guide channel 52. A generally U-shaped bracket 86 is secured to the outer end of each extensible piston 82 and is pivotally secured to the associated depending plate 84 through a support pin 88 in a conventional manner. Each of the fluid pressure actuated piston assemblies 80 is pivotally supported through generally horizontally extending support pins 90 between a pair of upstanding parallel spaced support members 92 having appropriate apertures therein to receive the support pins 90 such that the extensible pistons 82 and their associated brackets 86 underlie the corresponding depending plates 84. Each of the piston assemblies 80 includes a fluid pressure inlet coupling 94 thereon to allow the piston assembly to be coupled to a fluid pressure control circuit, as will be more fully described hereinbelow. Further, each piston assembly 80 has a fixed extension length for its associated piston 82 such that the cover plate 28 will be moved upward a predetermined distance upon extension of pistons 82.

Briefly, it can be seen with reference to FIGURE 1 that extension of the extensible pistons 82 through introduction of fluid pressure through the couplings 94 of the fluid pressure actuated piston assemblies 80 will effect upward movement of the corresponding guide channels 52, with the guide channels being maintained in horizontal relation by virtue of the parallelogram linkage arrangement above described. Such upward movement of the guide channels 52 will effect a corresponding upward movement of the movable cover plate 28 through the rollers 46 and spaced arm members 40 secured to the underside of the cover plate to a position shown in dash lines in FIGURE 1.

Preferably, a generally C-shaped cross channel support 96 is suitably secured by bolts 98 to the upper ends of four spaced upstanding support members 100. An upper horizontally extending flange portion 102 of support channel 96 underlies the forward edge 30 of the supporting floor surface 14 and provides a locating support means for the corresponding adjacent edge of the cover plate 28 when it is in a bridging position. The base frame 20 of the chamber 16 is preferably provided with a shoulder portion 104 adjacent the forward edge 32 of the supporting work surface 22 to provide a support means for the corresponding adjacent edge portion of the cover plate 28 when the plate is in bridging position. The horizontally extendinng flange portion 102 of the support channel 96 and the shoulder portion 104 of the chamber base frame 20 thus serve to locate the cover plate 28, when in its cavity bridging position, such that the cover plate is coplanar with the support floor surfaces 14 and 22. The fluid pressure actuated piston assemblies 80 are also preferably provided with means to limit the downward movement or retraction of the extensible pistons 82 such that retraction of the pistons will terminate when the cover plate 28 is seated upon the flange portion 102 of the cross channel 96 and the shoulder portion 104 of the chamber base frame 20.

A second means for moving the cover plate 28 horizontally to a second position wherein the cavity opening in front of the chamber 16 is uncovered is also provided within the cavity 12. Referring to FIGURE 3, taken in conjunction with FIGURES 1 and 2, the second means is adapted to effect movement of the cover plate 28 in a generally horizontal direction after the cover plate has been moved to a position raised from the plane of the floor supporting surface 14. The second means includes a linkage arrangement comprising a pair of arm members 108 fixedly secured on opposite ends of a rotatable shaft 110 through pins 112. The ends of the arms 108 opposite the rotatably mounted shaft 110 pivotally support adjustable linkages 114 through support pins 116. The adjustable linkages 114 includes threaded shaft portions 118 having U-shaped coupling ends 120 which are pivotally connected to depending plates 122 through pivot pins 124. The depending plates 122 are suitably secured to the underside of the movable cover plate 28 such that each associated plate 22, linkage 114 and arm 108 lies in substantially a single plane normal to the shaft 110.

The shaft 110 is disposed in transverse relation to the longitudinal axes of the guide channels 52 in a plane parallel to the plane of the cover plate 28. The actuating shaft 110 is supported for rotatable movement by a plurality of upstanding support plate members 126, with four such upstanding support plates being illustrated as suitably secured to corresponding upstanding support members 128. A bell crank lever 130 is suitably fixedly secured to the rotatable shaft 110 at a position generally intermediate the ends of the shaft. Alternatively, the rotatable shaft 110 may comprise two coaxial portions, with the adjacent ends of the two portions being received within and secured to cylindrical couplings 132 through roll pins 134. The cylindrical couplings 132 are, in turn, suitably secured to the bell crank lever 130 such that movement of the bell crank lever about the axis of the rotatable shaft 110 will effect rotation of the shafts 110. The bell crank lever 130 includes an outer extending end portion 136 which is pivotally connected through a connecting pin 138 to a U-shaped bracket 140 secured on the outer end of an extensible piston 142. The extensible piston 142 comprises the piston of a fluid pressure operated cylinder-piston assembly 144 having its end opposite the extensible piston 142 pivotally supported through a pin 146 to a supporting plate 148 which is suitably secured to the foundation 26 of the cavity 12 through anchor bolts 150.

Referring to FIGURE 3, it can be seen that selective rotation of the bell crank lever 130 in a counterclockwise direction about the axis of shaft 110 through retraction of the piston 142 within the cylinder-piston assembly 144 will effect a simultaneous counterclockwise rotational movement of the arm members 108 disposed on the outer end portions of the rotatable rod 110. Such rotational movement of the arms 108 will urge the movable cover plate member 28 toward the left, when viewing FIGURES 1 and 3, through the adjustable linkages 114. As the cover plate 28 is maintained in a generally horizontal position through cooperative association of the support arms 40 and rollers 46 with the guide channels 52, rotational movement of the arms 108 in either a clockwise or counterclockwise direction will effect horizontal movement of the cover plate 28 in a corresponding direction. The extent of horizontal movement of the cover plate 28 during movement to cavity uncovering and bridging positions may be readily controlled through controlling the extension of piston 142 in a known conventional manner. The adjustable linkages 114 further provide a means to adjust the extent of horizontal movement of the cover plate. It will be understood that the pivotal connections of the adjustable linkages 114 to the arms 108 allow the cover plate 28 to be raised upwardly through the piston assemblies 80 as above described without impeding the action of the piston assembly 144 in effecting horizontal movement of the cover plate.

A reinforcing support channel 152 is preferably suitably secured to the underside of the cover member 28 and extends in transverse relation to the parallel spaced arm members 40, the ends of the reinforcing channel terminating short of the arm members so as not to interfere with the pivotal connections of the supporting links 58 with their respective guide channels 52. The transverse reinforcing channel 152 has a vertical height such that when the cover plate 28 is in its cavity bridging position, a lower horizontal flange 153 on the reinforcing channel will rest upon the upper ends of the upstanding support members 128.

Referring now to FIGURE 5, a fluid pressure control circuit for effecting actuation of the first actuating means including the fluid pressure actuating cylinders 80, and the second actuating means including the cylinder-piston assembly 114 is shown schematically. For purposes of illustration, the fluid pressure control circuit of FIGURE 5 will be described as utilizing air as the working fluid in the control system. It will be understood that the control system could readily be adapted to the use of hydraulic fluid if desirable. A fluid pressure supply 154 comprising a conventional air pressure chamber has an outlet conduit 156 suitably secured thereto. The conduit 156 is coupled to an actuating on-off control valve 158 which, upon depression of a control button 160 thereon, allows fluid pressure to be introduced into the piston assemblies 80 to extend the pistons 82 and thereby raise the cover plate 28 to a position spaced above the plane of the supporting floor surface 14 as above described. The fluid pressure is transmitted to the couplings 94 of the piston assemblies 80 through a fluid pressure conduit 162. The control valve 158 thus forms the main actuating valve to be depressed by the operator when it is desired to move the cover plate 28 to uncover the cavity 12.

Upon opening the control valve 158 through depression of the control button 160, fluid pressure is also supplied through a fluid pressure conduit 164 to the first of a pair of series-connected, normally-opened flow control valves 166. Noting FIGURE 1, a flow control valve 166 is mounted on either side of the cover plate supporting mechanism, with each of the flow control valves being supported to underlie one of the supporting links 58 of the parallelogram linkage arrangement. Each of the flow control valves 166 is mounted on an upstanding support member 68 through a suitable support bracket 168 such that an actuating arm 170, pivotally supported on each valve 166, maintains an upwardly biased control button 172 in a depressed position through engagement of a roller 174 on the outer end of the arm 170 with the bottom surface of the associated supporting link 58. When the cover plate member 28 is in a bridging position as illustrated in FIGURE 1, the actuating arm 170 depresses the control button 172 to close the control valve 166, thereby precluding fluid pressure flow through the closed valves. Movement of the supporting links 58 in a counterclockwise direction (viewing FIGURE 1) about their supporting pins 66 during raising of the cover plate member 28 allows the actuating arms 170 to be urged upwardly by the upwardly biased control buttons 172 to thereby open the associated control valves 166.

It can thus be seen that by providing the pair of flow control valves 166 mounted respectively under opposite supporting links 58, fluid pressure flow through both valves will not take place until the cover plate 28 is moved to a predetermined position spaced upwardly from the plane of the supporting floor surface 14. Assuming the cover plate member 28 has been raised upwardly to the position shown in broken lines in FIGURE 1 through upward movement of pistons 82 and the guide channels 52, and that the flow control valves 166 have correspondingly been opened, fluid pressure will flow through suitable fluid pressure conduits 176 to a pair of manually operable pilot control valves 178 and 179. Simultaneously, fluid pressure from the control valves 166 will flow through conduits 180 to a pair of conventional normally closed pressure operated control valves 182. The pressure operated control valves 182 are such that opening of either of the manually operable pilot control valves 178 or 179, through operating buttons 178′, 179′, respectively, will allow fluid flow therethrough to open the corresponding control valve 182. Opening of one of the control valves 182 will allow fluid pressure to be introduced into an associated flow control valve 184 and thence to one end of the fluid pressure actuated cylinder-piston assembly 144 through either a fluid pressure conduit 186 or a conduit 188. The flow control valves 184 are adjustable to restrict the flow through their associated conduits 186 and 188 and thereby control the rate of extension or retraction of the piston 142. Means for allowing bleeding off of air pressure from an end of the cylinder-piston assembly 144 when the opposite end of the assembly is being utilized as a pressure chamber are shown schematically at 189 and 190. Such means may comprise conventional valves suitably connected to conduits 186 and 188 and operative through the operating buttons 178′, 179′, respectively, such that when the operating buttons are in their outer positions, the associated valves 189, 190 will be opened to connect the conduits 186 and 188 to atmosphere. Correspondingly, when one of the valves 178, 179 is opened as above described, the associated control valve 189, 190 will be closed to preclude bleeding off of pressure from the end of the piston assembly 144 being subjected to fluid pressure.

Having thus described the elements comprising a preferred embodiment of a bridging apparatus constructed in accordance with the present invention, its operation will now be briefly summarized. Assume, for purposes of illustration, that the cover plate member 28 is in a bridging position as shown in solid lines in FIGURE 1, and that it is desired to open the cavity 12 immediately in front of the chamber 16 to allow closure doors (not shown) of the chamber to be brought into closing position within the cavity 12 to sealingly close the opening in the chamber 16 defined by the front wall portions 18. The operator first depresses the control button 160 of the on-off flow control valve 158 (FIGURE 5) whereupon the fluid pressure actuated piston assemblies 80 will extend their respective pistons 82 to raise the guide channels 52. Raising the guide channels 52 will effect a corresponding raising of the cover plate 28 through the spaced parallel arms 40 and the rollers 46, the plane of the cover plate 28 being maintained in parallel relation to the plane of the supporting floor surface 14. When the cover plate 28 has been raised to a position wherein the plane of the plate is spaced above the plane of the supporting floor surface 14, with the upper flange 54 of the channel 52 being spaced below the supporting floor 14, the flow control valves 166 will be opened through movement of the supporting links 58 as above described. The operator may then depress the operating button 178′ of the manually operable pilot control valve 178 to open the associated normally closed control valve 182. Opening of the associated control valve 182 will allow fluid pressure flow through the associated control or metering valve 184 into the fluid pressure actuated cylinder-piston assembly 144 through conduit 186 to thereby retract the extensible piston 142. Noting FIGURE 3, retraction of the extensible piston 142 will effect a counterclockwise movement of the arm members 108 with a corresponding movement of the adjustable linkages 114. Such movement of the arms 108 and linkages 114 will cause horizontal movement of the cover plate member 28 within the guide channels 52 to thereby uncover the cavity or pit 12 in front of the chamber 16.

When it is desired to again bridge the cavity 12 to introduce work pieces into the chamber 16 or remove them therefrom, the doors of the chamber are first opened in a manner to remove them from the cavity 12. The operator then depresses operating button 179' to open valve 179 which opens the associated control valve 182 and allows fluid pressure flow into the corresponding end of the cylinder-piston assembly 144 through conduit 188. This causes extension of piston 142 to effect clockwise rotation of the bell crank lever 130 as viewed in FIGURE 3. Such clockwise rotation of the bell crank lever 130 causes a corresponding clockwise movement of the arms 108 and links 114 to move the cover plate 128 horizontally to a position overlying the cavity 12. The operator then adjusts the on-off control valve 158 to its "off" position, whereupon fluid pressure is exhausted from the fluid pressure actuated piston assemblied 80 to allow retraction of the pistons 82 and lower the guide channels 52 and the cover plate member 28 into their cavity bridging positions. The flow control valves 184 preferably include pressure relief means to relieve fluid pressure therefrom when the piston 142 has reached its desired extended or retracted positions.

The control circuit illustrated schematically in FIGURE 5 has been described as utilizing air as a working fluid with fluid pressure operated control valves. It will be understood, however, that electromechanical control valves and associated circuitry may be readily substituted for the fluid pressure operated control valves, such substitution being well within the knowledge of one skilled in the art.

The above described preferred embodiment of the subject bridging apparatus presents a low silhouette when in its raised position due to the cover plate supporting mechanism maintaining the cover plate in parallel relation to the supporting floor surface 14 during raising and horizontal movement of the cover plate. It will be understood that while the bridging apparatus 10 has been described in conjunction with the cavity 12 in front of a chamber 16, the subject bridging apparatus finds ready application in any situation requiring a means to bridge a cavity in a floor surface. Further, where necessary, the cover plate and supporting mechanism of the present invention could be readily adapted to lower the cover plate to a position spaced below the plane of the support surface 14 prior to horizontal movement of the cover plate to uncover the cavity opening in the supporting surface.

While a preferred embodiment of my invention has been shown and described, it will be understood that changes and modifications may be made therein without departing from the invention in its broader aspects.

I claim:

1. A bridging apparatus for use in bridging a cavity and the like having an opening in a support surface, comprising, in combination, a movable cover plate adapted to bridge the cavity when in generally coplanar relation with the support surface, guide channel means supported within the cavity for upward and downward movement below the support surface and in parallel relation thereto, support arm means secured to the underside of said cover plate and extending parallel to the plane of said cover plate in downwardly spaced relation therefrom, means interconnecting said support arm means and said guide channel means such that said support arm means are supported by said guide channel means for upward and downward movement therewith and for movement longitudinally therealong with said cover plate being supported in upward spaced relation from said guide channel means, first actuating means operatively associated with said guide channel means and adapted to raise said guide channel means to a position spaced below said support surface with said cover plate spaced upwardly from the support surface, and second actuating means operatively associated with said cover plate and adapted to selectively move said cover plate horizontally to a position wherein the support surface is received between said cover plate and said support arm means whereby to uncover the cavity opening.

2. A bridging apparatus as defined in claim 1 wherein said first and second actuating means are disposed within the cavity and include fluid pressure actuated means.

3. A bridging apparatus as defined in claim 1 including a control circuit for controlling said first and second actuating means, said control circuit being adapted to prevent movement of said cover plate by said second actuating means until said cover plate is moved to said position spaced upwardly from the support surface.

4. A bridging apparatus as defined in claim 1 including seal members mounted on said cover plate, said seal members being positioned to engage the support surface whene said cover plate is disposed in said coplanar relation with the support surface.

5. A bridging apparatus as defined in claim 3 including a generally parallelogram supporting linkage arrangement operatively associated with said guide channel means in supporting relation therewith, and wherein said control circuit includes at least one control valve operated by said supporting linkage arrangement.

6. For use in bridging a cavity having an opening in a support surface, a bridging apparatus comprising, in combination, a movable cover plate adapted to bridge the opening when in a position coplanar with the support surface, guide channel means operatively associated with said cover plate and adapted to support said cover plate for movement longitudinally along said guide channel means in upwardly spaced relation therewith, said guide channel means being disposed within the cavity and movable upwardly and downwardly below the support surface in parallel relation therewith, first fluid pressure actuated means operatively associated with said channel means and adapted to move said channel means to a position below the support surface with said cover plate being simultaneously moved to a position overlying the cavity opening, second fluid pressure actuated means operatively associated with said cover plate and adapted to move said cover plate horizontally to a second position wherein the cavity opening is uncovered, and control circuit means operatively associated with said first and second fluid pressure actuated means and including control valve means adapted to prevent movement of said cover plate to said second position prior to said cover plate being moved to said position overlying the cavity opening.

7. A bridging device as defined in claim 6 including sealing strips mounted on said cover plate such that said sealing strips engage the support surface when said cover plate is disposed in said coplanar relation with the support surface.

References Cited

UNITED STATES PATENTS

| 2,474,505 | 6/1949 | West | 49—212 |
| 2,815,203 | 12/1957 | Coors | 49—212 |

FOREIGN PATENTS

| 1,231,232 | 4/1960 | France. |
| 854,665 | 11/1952 | Germany. |

KENNETH DOWNEY, *Primary Examiner.*

U.S. Cl. X.R.

49—210, 212, 360